(12) United States Patent
Yeh

(10) Patent No.: US 10,678,698 B2
(45) Date of Patent: Jun. 9, 2020

(54) MEMORY STORAGE DEVICE, CONTROL CIRCUIT AND METHOD INCLUDING WRITING DISCONTINUOUSLY ARRANGED DATA INTO PHYSICAL PAGES ON WORD LINES IN DIFFERENT MEMORY SUB-MODULES

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 16 days.

(21) Appl. No.: 15/706,757

(22) Filed: Sep. 17, 2017

(65) Prior Publication Data

US 2019/0026227 A1 Jan. 24, 2019

(30) Foreign Application Priority Data

Jul. 20, 2017 (TW) .............................. 106124261 A

(51) Int. Cl.
*G06F 12/02* (2006.01)
*G06F 12/08* (2016.01)
(Continued)

(52) U.S. Cl.
CPC .......... *G06F 12/0884* (2013.01); *G06F 3/061* (2013.01); *G06F 3/0611* (2013.01);
(Continued)

(58) Field of Classification Search
CPC ............. G06F 12/0884; G06F 12/0246; G06F 3/0611; G06F 3/0679; G06F 3/061; G06F 3/0659
See application file for complete search history.

(56) References Cited

U.S. PATENT DOCUMENTS 9,720,609 B1 * 8/2017 Yan ...................... G06F 3/0619
9,977,735 B2 * 5/2018 Lee ..................... G06F 12/0246
(Continued)

FOREIGN PATENT DOCUMENTS

CN 102890617 1/2013
TW I591643 * 7/2017

OTHER PUBLICATIONS

Machine translation (in English) of CN 102890617 (bibliographic information/abstract, description and claims), downloaded from Espacenet on May 7, 2020, 34 pages.*

*Primary Examiner* — Glenn Gossage
(74) *Attorney, Agent, or Firm* — JCIPRNET

(57) ABSTRACT

A data writing method, a memory control circuit unit, and a memory storage device are provided. The data writing method includes transmitting a command to a host system to obtain a plurality of data, wherein the plurality of data are arranged in a sequence order in the host system, obtaining first data among the plurality of data and obtaining second data after obtaining the first data. The method further includes writing the first data to a corresponding physical page on a first word line among a plurality of word lines, and writing the second data to another corresponding physical page on a second word line among the plurality of word lines, wherein the first and second word lines belong to first and second memory sub-modules, and the first data and the second data are discontinuously arranged in the sequence order. The first and second data may each comprise sub-data, and the sub-data may be written into physical pages on the first and second word lines.

15 Claims, 10 Drawing Sheets

(51) Int. Cl.
*G06F 3/06* (2006.01)
*G06F 12/0884* (2016.01)

(52) U.S. Cl.
CPC .......... *G06F 3/0659* (2013.01); *G06F 3/0679* (2013.01); *G06F 12/0246* (2013.01)

(56) References Cited

U.S. PATENT DOCUMENTS

| | | | | |
|---|---|---|---|---|
| 2004/0225853 | A1* | 11/2004 | Lee | H05K 1/181 711/168 |
| 2009/0150597 | A1* | 6/2009 | Yang | G06F 12/0246 711/103 |
| 2009/0217136 | A1* | 8/2009 | Cheng | G06F 11/1068 714/773 |
| 2009/0287877 | A1* | 11/2009 | Chu | G06F 13/1668 711/103 |
| 2009/0300271 | A1* | 12/2009 | Yang | G06F 12/06 711/103 |
| 2010/0042774 | A1* | 2/2010 | Yang | G06F 12/0246 711/103 |
| 2011/0055457 | A1* | 3/2011 | Yeh | G06F 3/0611 711/103 |
| 2012/0096321 | A1* | 4/2012 | Yeh | G06F 12/0246 714/710 |
| 2012/0151158 | A1* | 6/2012 | Yeh | G06F 12/0246 711/154 |
| 2012/0198131 | A1* | 8/2012 | Tan | G06F 12/0246 711/103 |
| 2016/0284414 | A1* | 9/2016 | Lin | G06F 12/0246 |

\* cited by examiner

US 10,678,698 B2

MEMORY STORAGE DEVICE, CONTROL CIRCUIT AND METHOD INCLUDING WRITING DISCONTINUOUSLY ARRANGED DATA INTO PHYSICAL PAGES ON WORD LINES IN DIFFERENT MEMORY SUB-MODULES

CROSS-REFERENCE TO RELATED APPLICATION

This application claims the priority benefit of Taiwan application serial no. 106124261, filed on Jul. 20, 2017. The entirety of the above-mentioned patent application is hereby incorporated by reference herein and made a part of this specification.

BACKGROUND

Technical Field

The present invention relates to a data writing method, a memory control circuit unit and a memory storage device.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

In general, the rewritable non-volatile memory module includes a plurality of word lines, and a plurality of physical pages for storing data can be formed by memory cells on each word line. Based on a starting location and an ending location where the data is to be stored in the rewritable non-volatile memory module, a memory controller of a memory storage device usually gives commands to a host system to obtain continuous data to be stored between the starting location and the ending location.

In particular, when a parallel writing is to be performed on multiple word lines, the memory storage device often requires a large amount of space from a buffer memory for temporarily storing the continuous data from the host system. Later, during a programming process, the memory controller then selects the data to be stored in a corresponding physical page on each word line from the space of the buffer memory, and writes the selected data into the corresponding physical page on each word line, so as to achieve the effectiveness of the parallel writing.

Nonetheless, the above process normally consumes a considerable amount of space from the buffer memory. For that reason, if the buffer memory with large capacity is not disposed in the memory storage device, the parallel writing cannot be executed and thus a writing performance will be affected. Accordingly, finding a way to achieve a desired speed in the parallel writing of the data while reducing usage of the buffer memory is one of the major problems to be solved by a person skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data writing method, a memory control circuit unit and a memory storage device, which are capable of giving commands for obtaining multiple discontinuous data from a host system to be respectively stored in different word lines. As a result, the memory storage device may be prevented from consuming too many resources due to a massive amount of continuous data being temporarily stored while achieving the technical effect of simultaneously writing the physical pages on multiple word lines.

According to an exemplary embodiment, a data writing method for a rewritable non-volatile memory module is provided. The rewritable non-volatile memory module includes a plurality of memory sub-modules respectively coupled to a memory control circuit unit. The memory sub-modules include a plurality of word lines, and a plurality of physical pages are formed by a plurality of memory cells on the same word line among the plurality of word lines. The data writ g ethod includes:

transmitting a first data request command to a host system to obtain a plurality of data, wherein the plurality of data are arranged in a sequence order in the host system;

obtaining first data among the plurality of data from the host system according to the first data request command; obtaining second data among the plurality of data from the host system after obtaining the first data; writing the first data into a corresponding physical page on a first word line among the plurality of word lines via a first data bus; and writing the second data into another corresponding physical page on a second word line among the plurality of word lines via a second data bus. The first word line belongs to a first memory sub-module among the plurality of memory sub-modules. The second word line belongs to a second memory sub-module among the plurality of memory sub-modules. The first data and the second data are discontinuously arranged in the sequence order.

According to an exemplary embodiment, a memory control circuit unit configured to control a rewritable non-volatile memory module is provided. The rewritable non-volatile memory module includes a plurality of memory sub-modules. The memory sub-modules include a plurality of word lines, and a plurality of physical pages are formed by a plurality of memory cells on the same word line among the plurality of word lines. The memory control circuit unit includes a host interface, a memory interface and a memory management circuit. The host interface is configured to be coupled to a host system. The memory interface is coupled to the rewritable non-volatile memory module, and the plurality of memory sub-modules are respectively coupled to the memory interface. The memory management circuit is coupled to the host interface and the memory interface. The memory management circuit is configured to perform the following operations: transmitting a first data request command to a host system to obtain a plurality of data, wherein the plurality of data are arranged in a sequence order in the host system; obtaining first data among the plurality of data from the host system according to the first data request command; obtaining second data among the plurality of data from the host system after obtaining the first data; writing the first data into a corresponding physical page on a first word line among the plurality of word lines via a first data bus; and writing the second data into another corresponding physical page on a second word line among the plurality of word lines via a second data bus. The first word line belongs to a first memory sub-module in the plurality of memory sub-modules. The second word line belongs to a second memory sub-module in the plurality of memory sub-modules. The first data and the second data are discontinuously arranged in the sequence order.

According to an exemplary embodiment, a memory storage device, which includes a connection interface unit, a rewritable non-volatile memory module and a memory control circuit unit, is provided. The connection interface unit is configured to couple to a host system. The rewritable non-volatile memory module includes a plurality of memory sub-modules. The memory sub-modules include a plurality of word lines, and a plurality of physical pages are formed by a plurality of memory cells on the same word line among the plurality of word lines. The memory control circuit unit is coupled to the connection interface unit and the rewritable non-volatile memory module, and the plurality of memory sub-modules are respectively coupled to the memory control circuit unit. The memory control circuit unit is configured to perform the following operations: transmitting a first data request command to the host system to obtain a plurality of data, wherein the plurality of data are arranged in a sequence order in the host system; obtaining first data among the plurality of data from the host system according to the first data request command; obtaining second data among the plurality of data from the host system after obtaining the first data; writing the first data into a corresponding physical page on a first word line among the plurality of word lines via a first data bus; and writing the second data into another corresponding physical page on a second word line among the plurality of word lines via a second data bus. The first word line belongs to a first memory sub-module in the plurality of memory sub-modules. The second word line belongs to a second memory sub-module in the plurality of memory sub-modules. The first data and the second data are discontinuously arranged in the sequence order.

Based on the above, with the data writing method, the memory control circuit unit and the memory storage device according to the exemplary embodiments, commands can be given to obtain multiple discontinuous data to be respectively stored on the different word lines from the host system. Therefore, the memory storage device may be prevented from consuming too many resources due to a massive amount of continuous data being temporarily stored while achieving the technical effect of simultaneously writing the physical pages on multiple word lines.

To make the above features and advantages of the disclosure more comprehensible, several embodiments accompanied with drawings are described in detail as follows.

It should be understood, however, that this Summary may not contain all of the aspects and embodiments of the present invention, and is not meant to be limiting or restrictive in any manner. The invention as disclosed herein encompasses obvious improvements and modifications thereto as understood by those of ordinary skill in the art.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
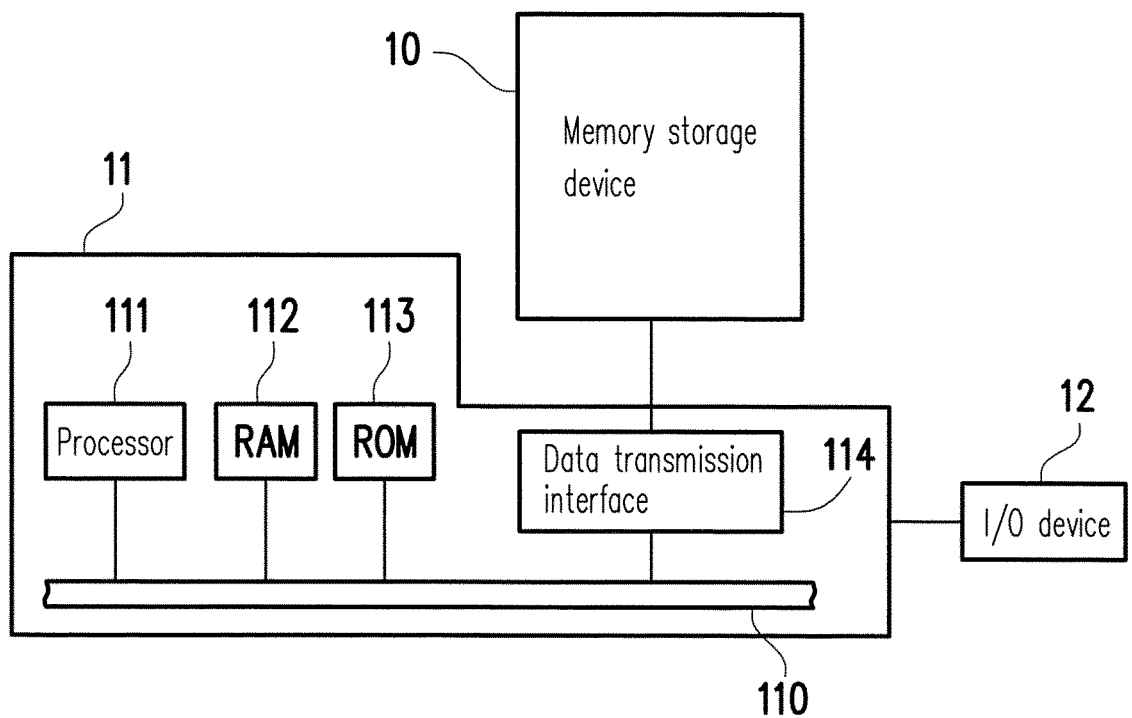
FIG. 1 is a schematic diagram illustrating a host system, a memory storage device and an I/O (input/output) device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

It is noted that in the following description, some terms may be replaced with corresponding abbreviations for ease of reading (see Table 1).

TABLE 1

| rewritable non-volatile memory module | RNVM module |
| --- | --- |
| physical erasing unit | PEU |
| physical programming unit | PPU |
| logical erasing unit | LEU |

TABLE 1-continued

| rewritable non-volatile memory module | RNVM module |
|---|---|
| memory management circuit | MMC |
| memory control circuit | MCC |

Figure 2:
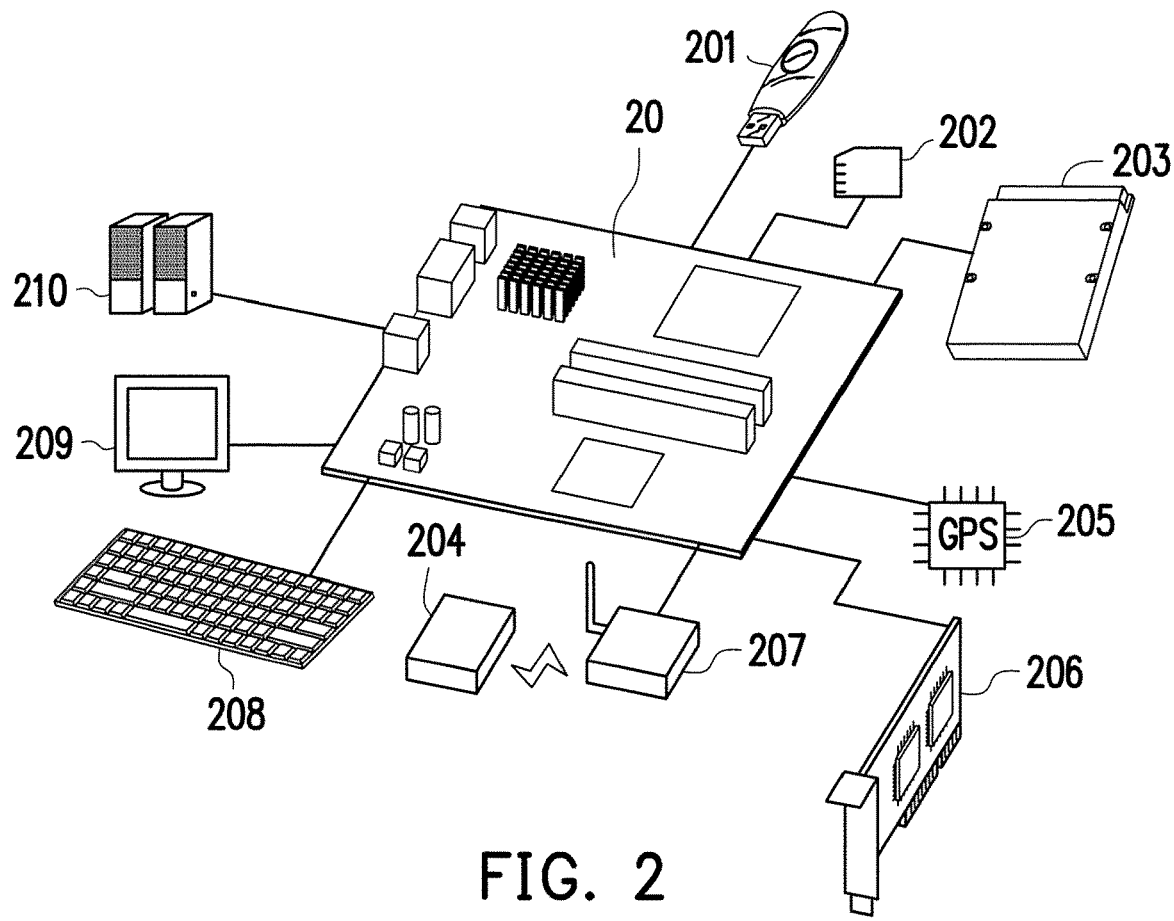
FIG. 2 is a schematic diagram illustrating a host system, a memory storage device and an I/O device according to another exemplary embodiment.

FIG. 1 is a schematic diagram illustrating a host system, a memory storage device and an I/O (input/output) device according to an exemplary embodiment. FIG. 2 is a schematic diagram illustrating a host system, a memory storage device and an I/O device according to another exemplary embodiment.

Referring to FIG. 1, a host system 11 generally includes a processor 111, a

RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can store data into the memory storage device 10 or read data from the memory storage device 10 through the data transmission interface 114. Further, the host system 11 is coupled to an I/O device 12 via the system bus 110. For example, the host system 11 can transmit output signals to the I/O device 12 or receive input signals from the I/O device 12 via the system bus 110.

Referring to FIG. 1 and FIG. 2, in the present exemplary embodiment, the processor 111, the RAM 112, the ROM 113 and the data transmission interface 114 may be disposed on a main board 20 of the host system 11. The number of data transmissioninterfaces 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a Wi-Fi™ (Wireless Fidelity) memory storage device, a Bluetooth™ memory storage device, a BLE (Bluetooth low energy) memory storage device (e.g., iBeacon™) Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
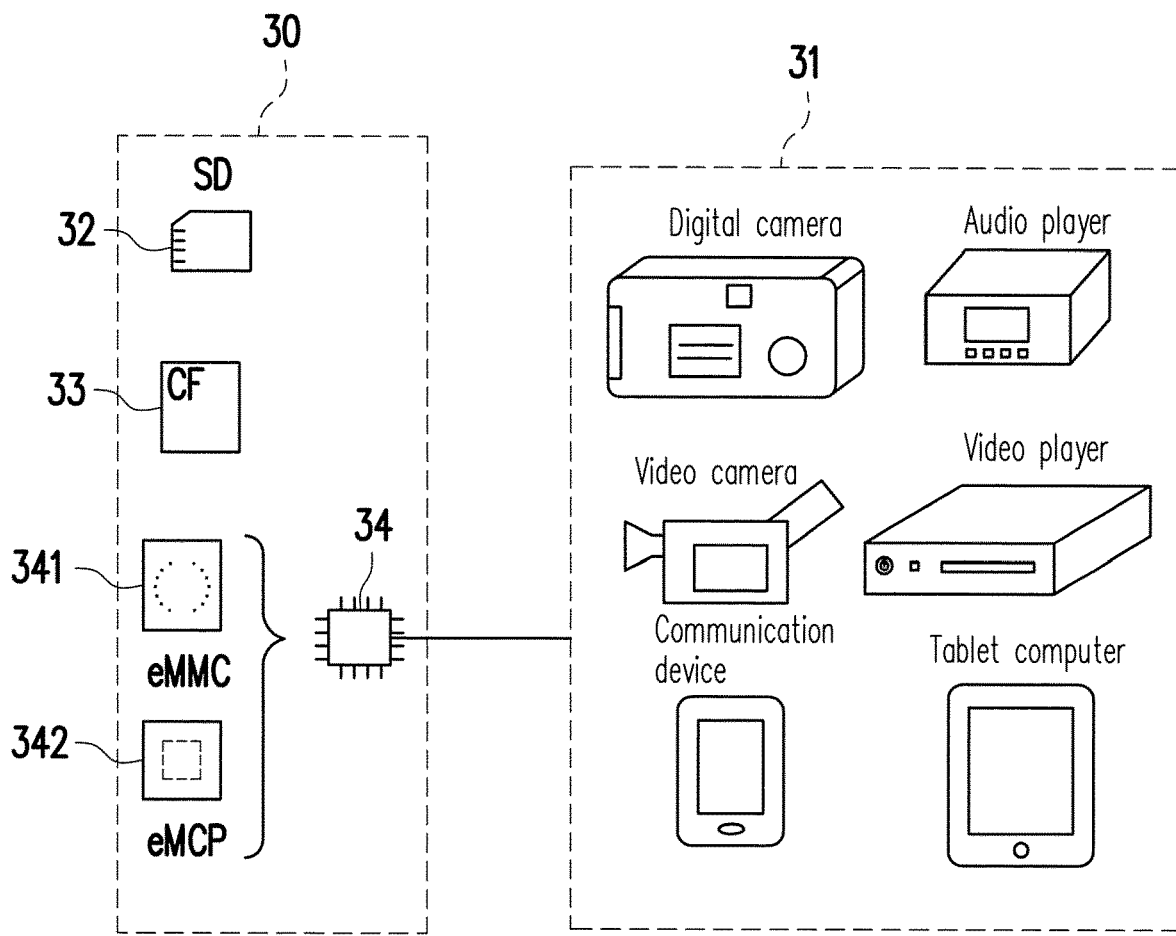
FIG. 3 is a schematic diagram illustrating a host system and a memory storage device according to another exemplary embodiment.

In an exemplary embodiment, the aforementioned host system may be any system capable of substantially cooperating with the memory storage device for storing data. Although the host system is illustrated as a computer system in the foregoing exemplary embodiments, FIG. 3 is a schematic diagram illustrating a host system and a memory storage device according to another exemplary embodiment of the invention. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 31, such as a SD™ (Secure Digital) card 32, a CF™ (Compact Flash) card 33 or an embedded storage device 34. The embedded storage device 34 may include various embedded storage devices capable of directly coupling a memory module onto a substrate of the host system, such as an eMMC™ (embedded Multi Media Card) 341 and/or an eMCP (embedded Multi Chip Package) storage device 342.

Figure 4:
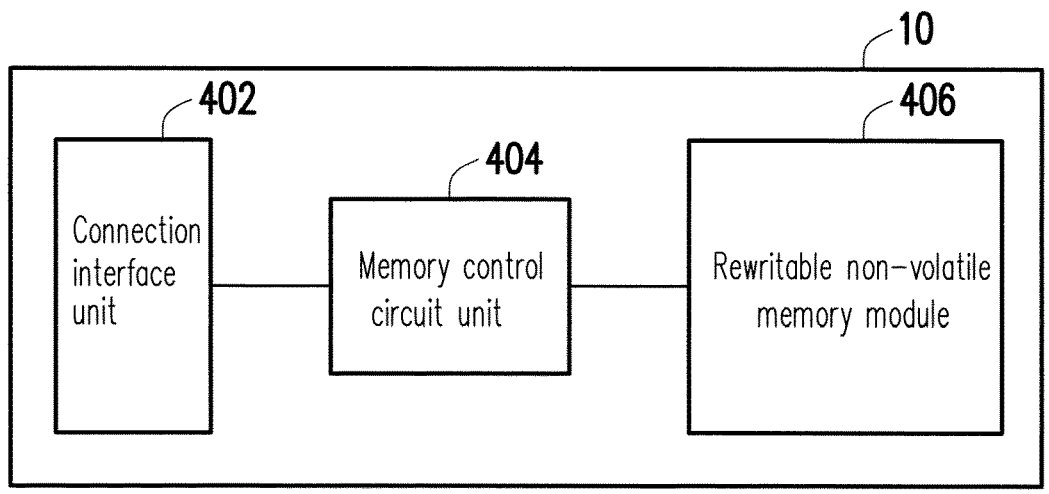
FIG. 4 is a schematic block diagram illustrating a memory storage device according to an exemplary embodiment.

FIG. 4 is a schematic block diagram illustrating a memory storage device according to an exemplary embodiment.

Referring to FIG. 4, the memory storage device 10 includes a connection interface unit 402, a memory control circuit (MCC) unit 404 and a rewritable non-volatile memory (RNVM) module 406.

The connection interface unit 402 is configured to couple the memory storage device 10 to the host system 11. In the present exemplary embodiment, the connection interface unit 402 is compatible with a PCI Express™ (Peripheral Component Interconnect Express) interface standard, and is also compatible with an NVM express interface standard. Specifically, the NVM express interface standard refers to a protocol for communication between the host system and the memory storage device, which defines a register interface, command set and feature set between a controller of the memory storage device and an operating system of the host system and aims to improve a data access speed and a data transmission rate for the PCIe interface-based memory storage device by optimizing the interface standard of the memory storage device. However, in another exemplary embodiment, the connection interface unit 402 may also be compatible with other suitable standards. In addition, the connection interface unit 402 and the MCC unit 404 may be packaged into one chip, or the connection interface unit 402 may be distributed outside of a chip containing the MCC unit 404.

The MCC unit 404 is configured to implement logic gates or execute control commands which are implemented in a hardware form or in a firmware form and perform operations, such as writing, reading or erasing data in the RNVM module 406 according to the commands of the host system 11.

The RNVM module 406 is coupled to the MCC unit 404 and configured to store data written from the host system 11. The RNVM module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the RNVM module 406, one or more bits are stored by changing a voltage (a.k.a. a threshold voltage) of each of the memory cells. More specifically, in each of the memory cells, a charge trapping layer is provided between a control gate and a channel. The amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". Each of the memory cells in the RNVM module 406 has a plurality of storage states depending on changes in the threshold voltage. The storage state to which the memory cell belongs may be determined by applying a read voltage to the memory cell, so as to obtain the one or more bits stored in the memory cell.

In the present exemplary embodiment, the memory cells of the RNVM module 406 constitute a plurality of physical programming units (PPUs), and the PPUs constitute a plurality of physical erasing units (PEUs). Specifically, the memory cells on the same word line constitute one or more of the PPUs. If each of the memory cells can store more than one bit, the PPUs on the same word line can be at least classified into a lower PPU and an upper PPU. For instance, a least significant bit (LSB) of one memory cell belongs to the lower PPU, and a most significant bit (MSB) of one memory cell belongs to the upper PPU. Generally, in the MLC NAND flash memory, a writing speed of the lower PPU is higher than a writing speed of the upper PPU, and/or a reliability of the lower PPU is higher than a reliability of the upper PPU.

In the present exemplary embodiment, the PPU is the minimum unit for programming. That is, the PPU is the minimum unit for writing data. For example, a PPU is a physical page or a physical sector. When a PPU is a physical page, the PPU usually includes a data bit area and a redundancy bit area. The data bit area includes multiple physical sectors configured to store user data, and the redundant bit area is configured to store system data (e.g., management data such as an error correcting code, etc.). In the present exemplary embodiment, the data bit area includes 32 physical sectors, and a size of each physical sector is 512 bytes (B). However, in other exemplary embodiments, the data bit area may also include 8 or 16 physical sectors, or a different number (more or less) of physical sectors, and the size of each physical sector may also be greater or smaller. On the other hand, the PEU is the minimum unit for erasing. Namely, each PEU contains the least number of memory cells to be erased together. For instance, the PEU is a physical block.

Figure 5:
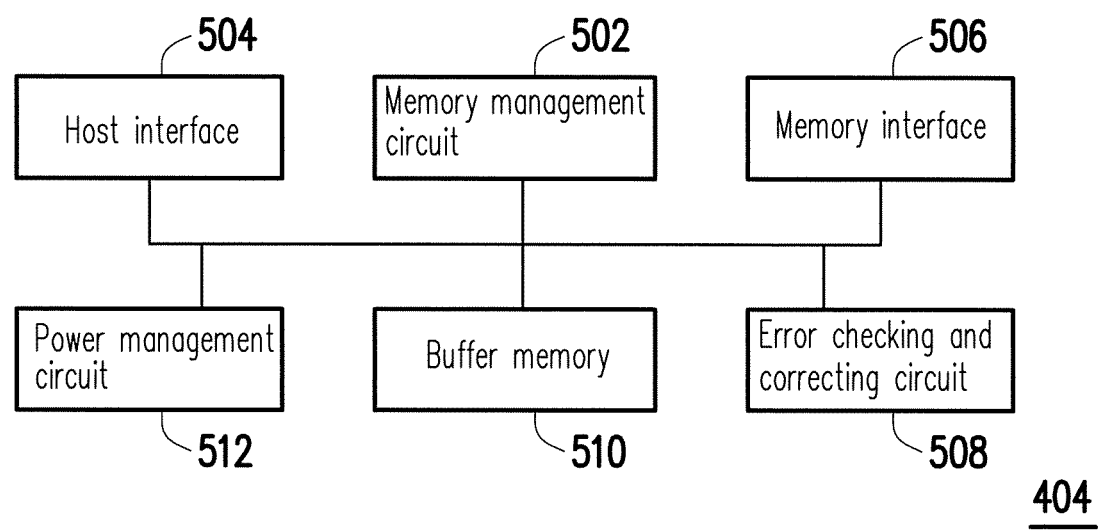
FIG. 5 is a schematic block diagram illustrating a memory control circuit unit according to an exemplary embodiment.

FIG. 5 is a schematic block diagram illustrating a memory control circuit (MCC) unit according to an exemplary embodiment.

Referring to FIG. 5, the MCC unit 404 includes a memory management circuit (MMC) 502, a host interface 504 and a memory interface 506.

The MMC 502 is configured to control overall operations of the MCC unit 404. Specifically, the MMC 502 executes a plurality of control commands to perform various operations such as writing, reading and erasing data during operation of the memory storage device 10. Hereinafter, the operations of the MMC 502 are described as equivalent to describe the operations of the MCC unit 404.

In the present exemplary embodiment, the control commands of the MMC 502 are implemented in a firmware form. For instance, the MMC 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the MMC 502 may also be stored as program codes in a specific area (for example, the system area in a memory exclusively used for storing system data) of the RNVM module 406. In addition, the MMC 502 has a microprocessor unit (not illustrated), the read only memory (not illustrated) and a random access memory (not illustrated). More particularly, the ROM has a boot code, which is executed by the microprocessor unit to load the control commands stored in the RNVM module 406 to the RAM of the MMC 502 when the MCC unit 404 is enabled. Then, the control commands are executed by the microprocessor unit to perform operations, such as writing, reading or erasing data.

Further, in another exemplary embodiment, the control commands of the MMC 502 may also be implemented in a hardware form. For example, the MMC 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the RNVM module 406 or a group thereof. The memory writing circuit is configured to give a write command sequence for the RNVM module 406 in order to write data into the RNVM module 406. The memory reading circuit is configured to give a read command sequence for the RNVM module 406 in order to read data from the RNVM module 406. The memory erasing circuit is configured to give an erase command sequence for the RNVM module 406 in order to erase data from the RNVM module 406. The data processing circuit is configured to process both the data to be written into the RNVM module 406 and the data read from the RNVM module 406. Each of the write command sequence, the read command sequence and the erase command sequence may include one or more program codes or command codes, and instruct the RNVM module 406 to perform the corresponding operations, such as writing, reading and erasing. In an exemplary embodiment, the MMC 502 may further give a command sequence of other types to the RNVM module 406 for instructing the RNVM module to perfoirrr the corresponding operations.

The host interface 504 is coupled to the MMC 502 and configured to receive and identify commands and data sent from the host system 11. In other words, the commands and data transmitted by the host system 11 are transmitted to the MMC 502 via the host interface 504. In the present exemplary embodiment, the host interface 504 is compatible with the Serial Advanced Technology Attachment (SATA) standard. However, it should be understood that the invention is not limited thereto, and the host interface 504 may also be compatible with the Parallel Advanced Technology Attachment (PATA) standard, the Institute of Electrical and Electronics Engineers 1394 (IEEE 1394) standard, the Peripheral Component Interconnect Express (PCI Express™) standard, the Universal Serial Bus (USB) standard, the Secure Digital™ (SD) standard, the Ultra High Speed-I (UHS-1) standard, the UHS-II standard, the Memory Stick™(MS) standard, the Multimedia Card™ (MMC) standard, the embedded MMC™ (eMMC) standard, the Universal Flash Storage™ (UFS) standard, the Compact Flash™ (CF) standard, the Integrated Drive Electronics (IDE) standard, or other suitable standards for data transmission.

The memory interface 506 is coupled to the MMC 502 and configured to access the RNVM module 406. In other words, data to be written into the RNVM module 406 is converted into a format acceptable by the RNVM module 406 via the memory interface 506. Specifically, if the MMC 502 intends to access the RNVM module 406, the memory interface 506 sends corresponding command sequences. For example, the command sequences may include the write command sequence which instructs the RNVM module to write data, the read command sequence which instructs the RNVM module to read data, the erase command sequence which instructs the RNVM module to erase data, and other corresponding command sequences for instructing to perform various memory operations (e.g., changing read voltage levels or performing a garbage collection procedure). These command sequences are generated by the MMC 502 and transmitted to the RNVM module 406 through the memory interface 506, for example. The command sequences may include one or more signals, or data transmitted on the bus. The signals or the data may include command codes and program codes. For example, information such as identification codes and memory addresses are included in the read command sequence.

In an exemplary embodiment, the MCC unit 404 further includes an error checking and correcting circuit 508, a buffer memory 510 and a power management circuit 512.

The error checking and correcting circuit 508 is coupled to the MMC 502 and configured to perform an error checking and correcting operation to ensure the correctness of data. Specifically, when the MMC 502 receives the write command from the host system 11, the error checking and correcting circuit 508 generates an ECC (error correcting code) and/or an EDC (error detecting code) for data corresponding to the write command, and the MMC 502 writes data corresponding to the write command and the corresponding ECC and/or the EDC into the RNVM module 406. Then, when the MMC 502 reads the data from the RNVM module 406, the corresponding ECC and/or the EDC are also read, and the error checking and correcting circuit 508 performs the error checking and correcting operation on the read data based on the ECC and/or the EDC.

The buffer memory 510 is coupled to the MMC 502 and configured to temporarily store data and commands from the host system 11 or data from the RNVM module 406. The power management unit 512 is coupled to the MMC 502 and configured to control power of the memory storage device 10.

Figure 6:
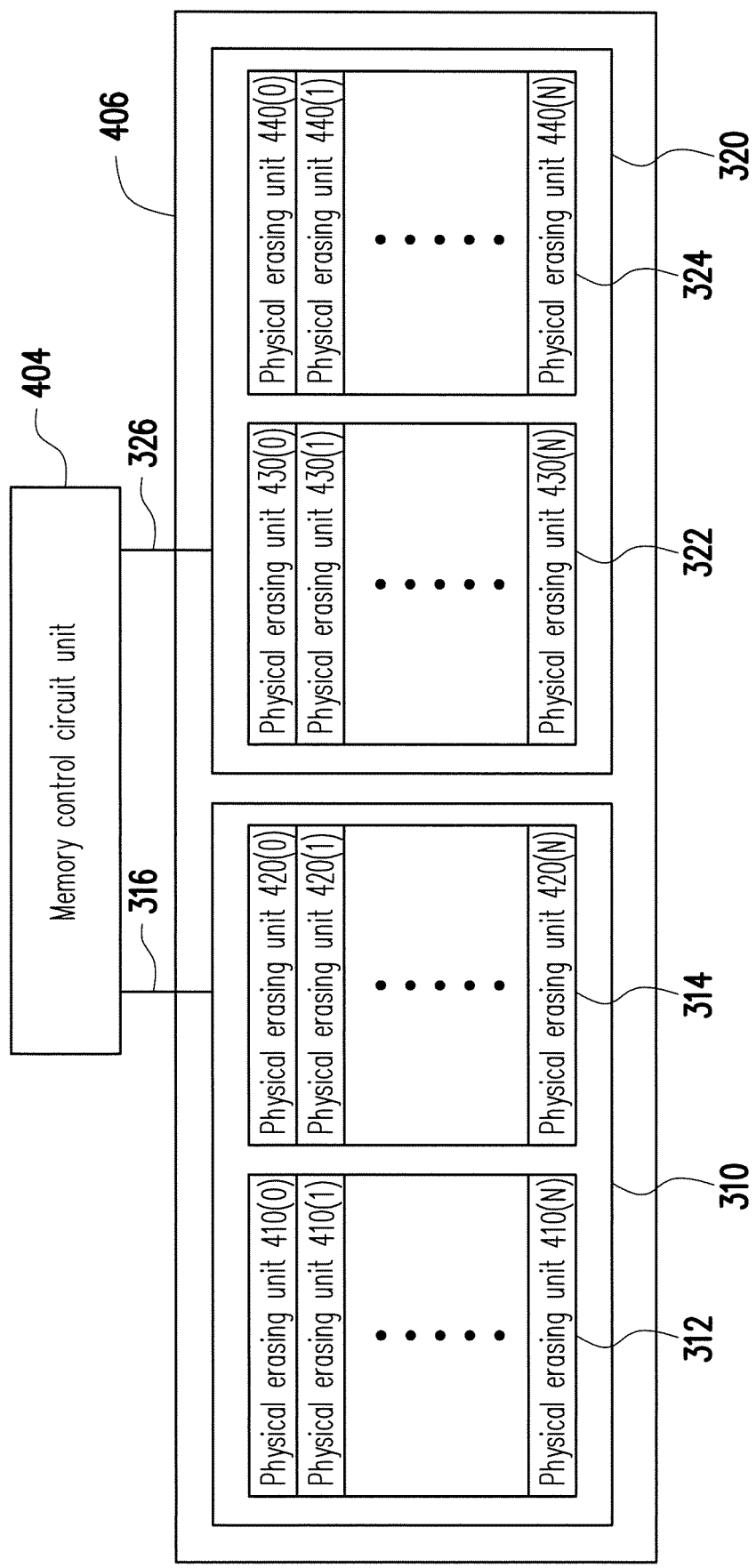
FIG. 6 is a schematic diagram illustrating a memory control circuit unit and a rewritable non-volatile memory module according to an exemplary embodiment.

FIG. 6 is a schematic block diagram illustrating a memory control circuit (MCC) unit and a RNVM module according to an exemplary embodiment.

With reference to FIG. 6, the RNVM module 406 includes a first memory sub-module 310 and a second memory sub-module 320. For example, each of the memory sub-module 310 and the second memory sub-module 320 is a memory die. The first memory sub-module 310 has a first plane 312 and a second plane 314, and the second memory sub-module 320 has a first plane 322 and a second plane 324. The first plane 312 of the first memory sub-module 310 includes PEUs 410(0) to 410(N); the second plane 314 of the first memory sub-module 310 includes PEUs 420(0) to 420(N); the first plane 322 of the second memory sub-module 320 includes PEUs 430(0) to 430(N); and the second plane 324 of the second memory sub-module 320 includes PEUs 440(0) to 440(N).

For example, the first memory sub-module 310 and the second memory sub-module 320 are coupled to the MCC unit 404 respectively through independent data bus 316 and data bus 326. Accordingly, the MMC 502 can write the data into the first memory sub-module 310 and the second memory sub-module 320 respectively via the data bus 316 and the data bus 326 in a parallel manner.

However, it should be understood that, in another exemplary embodiment, the first memory sub-module 310 and the second memory sub-module 320 may be coupled to the MCC unit 404 through only one data bus. Here, the MMC 502 can write the data into the first memory sub-module 310 and the second memory sub-module 320 via the single data bus in an interleave manner.

In particular, each of the first memory sub-module 310 and the second memory sub-module 320 may include a plurality of word lines, and a plurality of physical pages are formed by a plurality of memory cells on the same word line. Each PEU of the first memory sub-module 310 and the second memory sub-module 320 has multiple physical pages, and the physical pages belonging to the same PEU may be written separately and erased simultaneously. For example, each PEU is constituted by 128 physical pages. Nevertheless, it should be understood that the invention is not limited to the above. Each PEU may be constituted by 64 pages, 256 physical pages or any number of physical pages.

More specifically, the PEU is a minimum unit for erasing. Namely, each PEU contains the least number of memory cells to be erased together. The physical page is the minimum unit for programming. That is, the physical page is the minimum unit for writing data. However, it should be understood that, in another exemplary embodiment of the invention, the minimum unit for writing data may also be a sector or other units. Each of the physical pages usually includes a data bit area and a redundant bit area. The data bit area is configured for storing the user data, and the redundant bit area is configured for storing the system data (e.g., an error checking and correcting (ECC) code). It should be noted that, in another exemplary embodiment, one physical unit may also refer to one physical address, one PPU, or a composition of a plurality of continuous or discontinuous physical addresses.

It is noted that the exemplary embodiment of the invention is described by using the RNVM module 406 that includes two memory sub-modules as an example, but the invention is not limited thereto.

In the present exemplary embodiment, the MMC 502 can give a data request command to the host system 11. The data request command is configured to instruct the host system 11 to transmit a first data to be stored in a corresponding physical page on a word line in the RNVM module 406 and a second data to be stored in another corresponding physical page on another word line in the RNVM module 406. Among them, the word line for writing the first data belongs to a first memory sub-module, the word line for writing the second data belongs to a second memory sub-module, and the first memory sub-module is different from the second memory sub-module. The first data and the second data may be two discontinuous data in a plurality of continuous data. In other words, in the present exemplary embodiment, the MMC 502 can obtain all the data without following an original sequential order of the data by giving the data request command to the host system 11, so as to instead directly obtain the corresponding data for writing following the location of the data actually stored in the physical page. After all the data is obtained, all the data may be temporarily stored into the buffer memory 510. Because the MMC 502 does not need to select data, but may simply obtain the currently required data for writing from the host system 11 directly, usage of the buffer memory 510 may be reduced accordingly.

Figure 7:
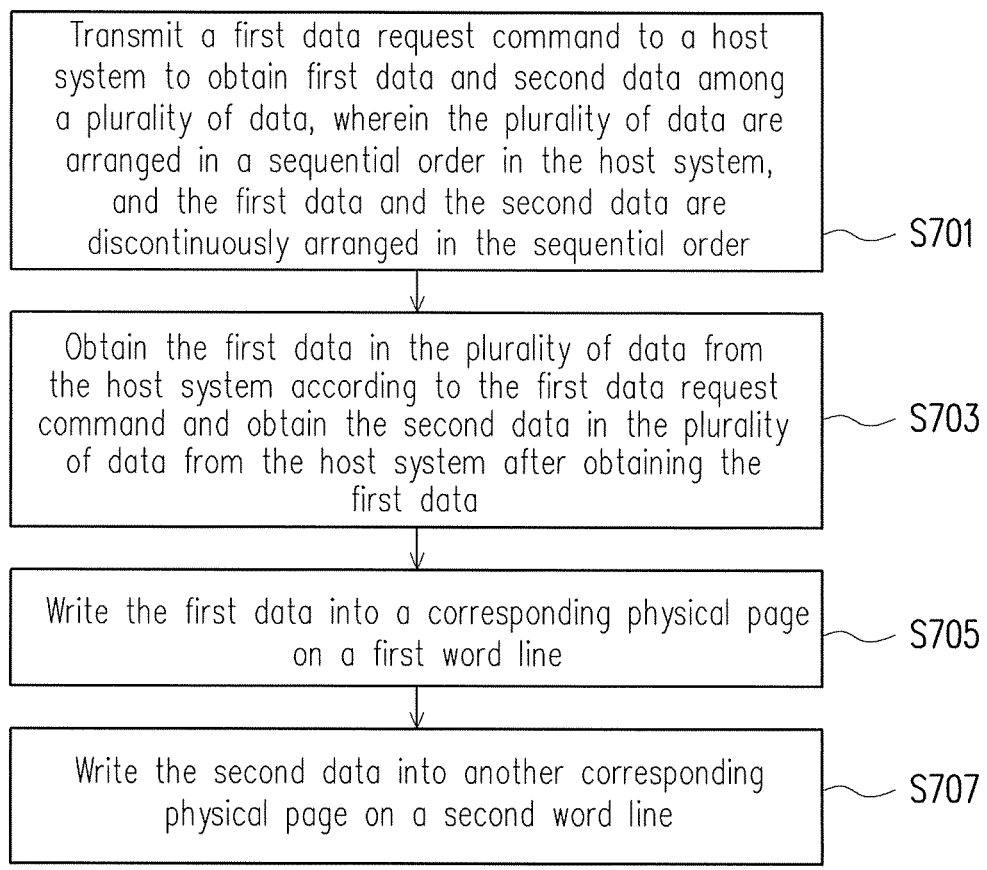
FIG. 7 is a flowchart of a data writing method according to an exemplary embodiment.

FIG. 7 is a flowchart of a data writing method according to an exemplary embodiment of the invention.

With reference to FIG. 7, in step S701, the MMC 502 transmits a first data request command to a host system 11 to obtain first data and second data among a plurality of data, wherein the plurality of data are arranged in a sequential order in the host system, and the first data and the second data are discontinuously arranged in the sequential order. Here, the first data request command is configured to instruct the host system 11 to transmit the first data to be stored in a corresponding physical page on a first word line and the second data to be stored in another corresponding page on a second word line. In step S703, the MMC 502 obtains the first data in the plurality of data from the host system 11 according to the first data request command and obtains the second data in the plurality of data from the host system 11 after obtaining the first data. Thereafter, in step S705, the MMC 502 writes the first data into the corresponding physical page on the first word line. Lastly, in step S707, the MMC 502 writes the second data into the another corresponding physical page on the second word line. In particular, the first word line belongs to the first memory sub-module, the second word line belongs to the second memory sub-module, and the first memory sub-module is different from the second memory sub-module.

Data writing processes in the data writing method of the present application will be described in more detail with reference to the following embodiments.

Figure 8A:
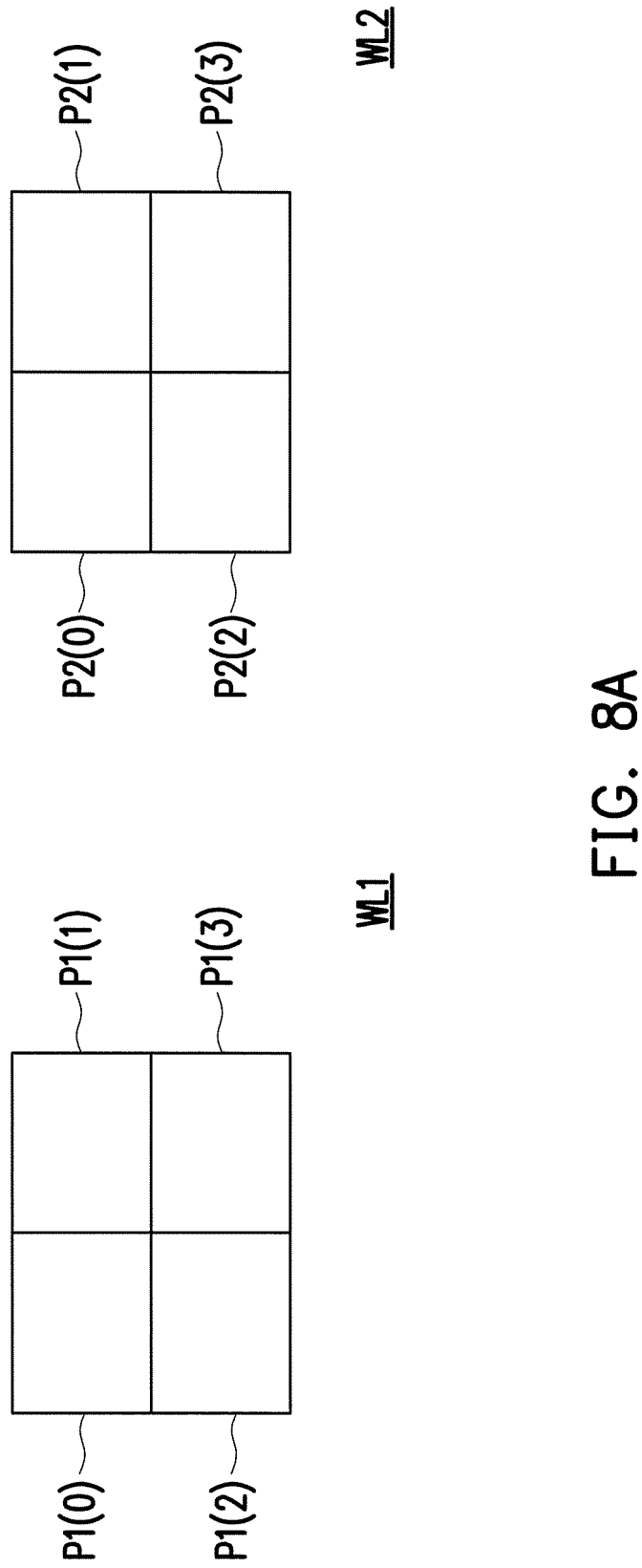
FIG. 8A to FIG. 8C illustrate schematic diagrams illustrating writing a plurality of data into physical pages on a plurality of word lines respectively according to an exemplary embodiment.
Figure 8B:
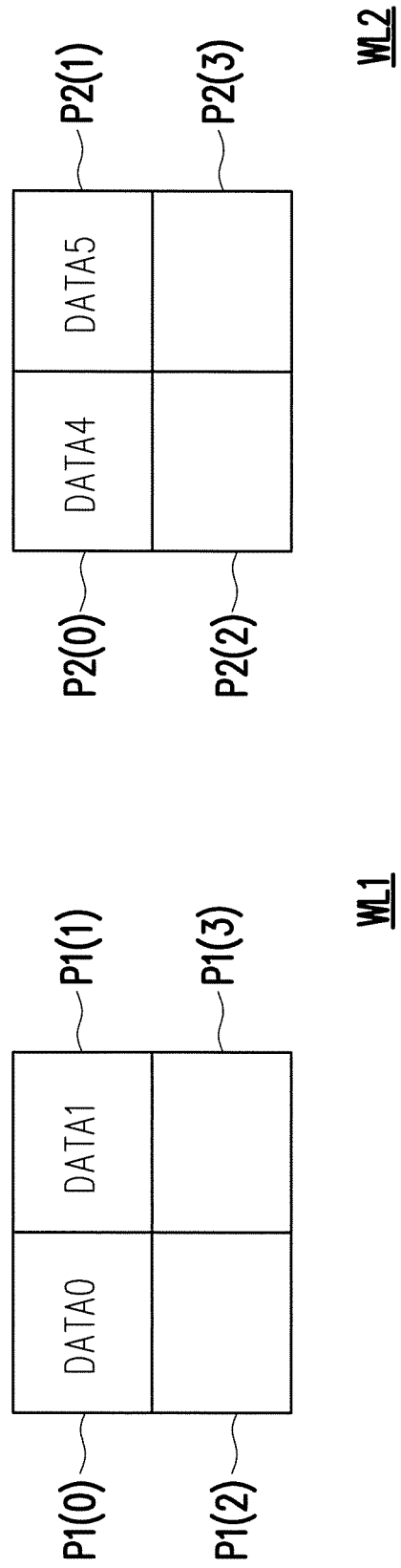
Figure 8C:
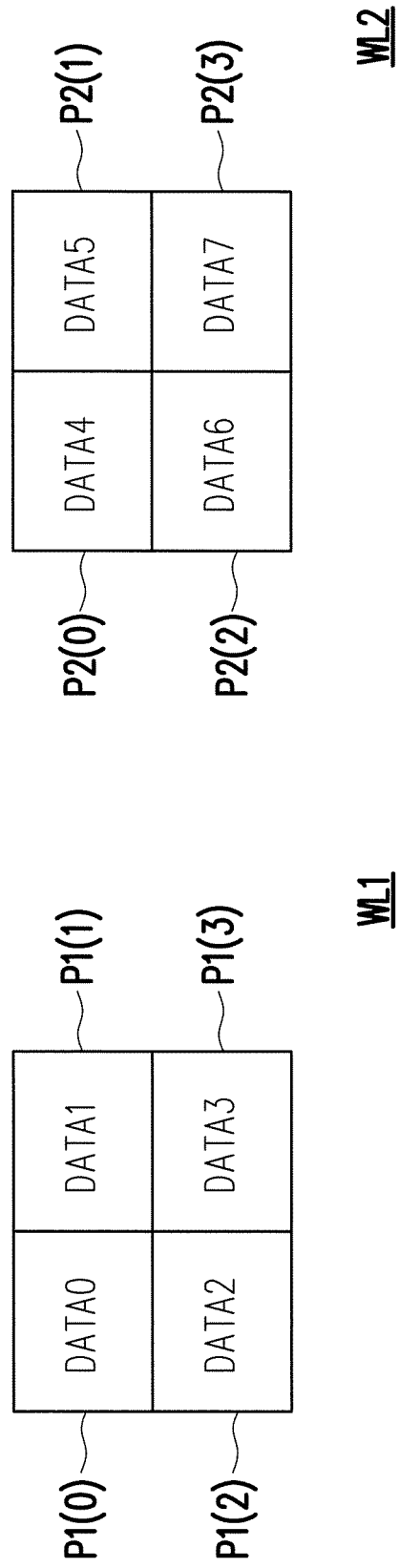

FIG. 8A to FIG. 8C illustrate schematic diagrams for writing a plurality of data into physical pages on a plurality of word lines respectively according to an exemplary embodiment.

With reference to FIG. 8A to FIG. 8C, in the present exemplary embodiment, it is assumed that the RNVM module 406 is a Three-Dimensional (3D) NAND flash memory module, and four physical pages can be formed by the memory cells on each word line in the RNVM module 406. As shown in FIG. 8A, the RNVM module 406 may include, for example, a word line WL1 (a.k.a. the first word line) belonging to the first memory sub-module and a word line WL2 (a.k.a. the second word line) belonging to the second memory sub-module. Physical pages P1(0) to P1(3) are formed by the memory cells on the word line WL1, and physical pages P2(0) to P2(3) are formed by the memory cells on the word line WL2.

It should be noted that, it is assumed herein that the MMC 502 intends to write a plurality of data into the physical pages on the word line WL1 and the word line WL2. The plurality of data include first data, second data, third data and fourth data, and a sequence order of the plurality of data is in the following order: the first data, the third data, the second data and the fourth data. Among them, the first data includes a sub-data DATA0 and a sub-data DATA1; the third data includes a sub-data DATA2 and a sub-data DATA3; the second data includes a sub-data DATA4 and a sub-data DATA5; the fourth data includes a sub-data DATA6 and a sub-data DATA7. In other words, in terms of the sub-data, a sequence order of the sub-data is the following order: the sub-data DATA0, the sub-data DATA1, the sub-data DATA2, the sub-data DATA3, the sub-data DATA4, the sub-data DATA5, the sub-data DATA6 and the sub-data DATA7.

When the MMC 502 intends to perform the parallel writing for the physical pages on the word line WL1 and the word line WL2, the MMC 502 transmits at least one data request command (a.k.a. the first data request command) to the host system 11, so as to request the host system 11 to transmit data to be stored in the physical page P1(0) and the physical page P1(1) on the word line WL1 and data to be stored in the physical page P2(0) and the physical page P2(1) on the word line WL2.

Next, with reference to FIG. 8B, the MMC 502 obtains the first data and the second data among the plurality of continuous data from the host system 11 according to the aforesaid first data request command. The first data includes the sub-data DATA0 (a.k.a. a first sub-data) to be written into the physical page P1(0) on the word line WL1 and the sub-data DATA1 (a.k.a. a second sub-data) to be written into the physical page P1(1) on the word line WL1. The second data includes the sub-data DATA4 (a.k.a. a third sub-data) to be written into the physical page P2(0) on the word line WL2 and the sub-data DATA5 (a.k.a. a fourth sub-data) to be written into the physical page P2(1) on the word line WL2. In other words, the first data request command is configured to obtain the first data and the second data which are discontinuously arranged in the plurality of continuous data. Thereafter, the MMC 502 can sequentially write the sub-data DATA0 and the sub-data DATA1 into the physical page P1(0) (a.k.a. a first physical page) and the physical page P1(1) (a.k.a. a second physical page) respectively. Similarly, the MMC 502 can sequentially write the sub-data DATA4 and the sub-data DATA5 into the physical page P2(0) (a.k.a. a third physical page) and the physical page P2(1) (a.k.a. a fourth physical page) respectively.

Then, the MMC 502 can further transmit at least one data request command (a.k.a. a second data request command) to the host system 11, so as to request the host system 11 to transmit data to be stored in the physical page P1(2) and the physical page P1(3) on the word line WL1 and data to be stored in the physical page P2(2) and the physical page P2(3) on the word line WL2.

With reference to FIG. 8C, the MMC 520 can obtain the third data and the fourth data in the plurality of continuous data from the host system 11 according to aforesaid second data request command. The third data includes the sub-data DATA2 (a.k.a. a fifth sub-data) to be written into the physical page P1(2) on the word line WL1 and the sub-data DATA3 (a.k.a. a sixth sub-data) to be written into the physical page P1(3) on the word line WL1. The fourth data includes the sub-data DATA6 (a.k.a. a seventh sub-data) to be written into the physical page P2(2) on the word line WL2 and the sub-data DATA7 (a.k.a. an eighth sub-data) to be written into the physical page P2(3) on the word line WL2. In other words, the second data request command is configured to obtain the third data and the fourth data which are discontinuously arranged in the plurality of continuous data. Thereafter, the MMC 502 can sequentially write the sub-data DATA2 and the sub-data DATA3 into the physical page P1(2) (a.k.a. a fifth physical page) and the physical page P1(3) (a.k.a. a sixth physical page) respectively. Similarly, the MMC 502 can sequentially write the sub-data DATA6 and the sub-data DATA7 into the physical page P2(2) (a.k.a. a seventh physical page) and the physical page P2(3) (a.k.a. an eighth physical page) respectively.

In particular, after going through the writing operation as described above, the third data stored in the physical pages P1(2) to P1(3) at the end of the word line WL1 is arranged subsequent to the second data stored in the physical pages P2(0) to P2(1) at the beginning of the word line WL2. In other words, after going through the writing operation as described above, the data will be sequentially stored in the word line WL1 and the word line WL2.

However, it should be noted that, the invention is not intended to limit the number of the physical pages on one word line. In other embodiments, one word line may include more or less physical pages.

Figure 9:
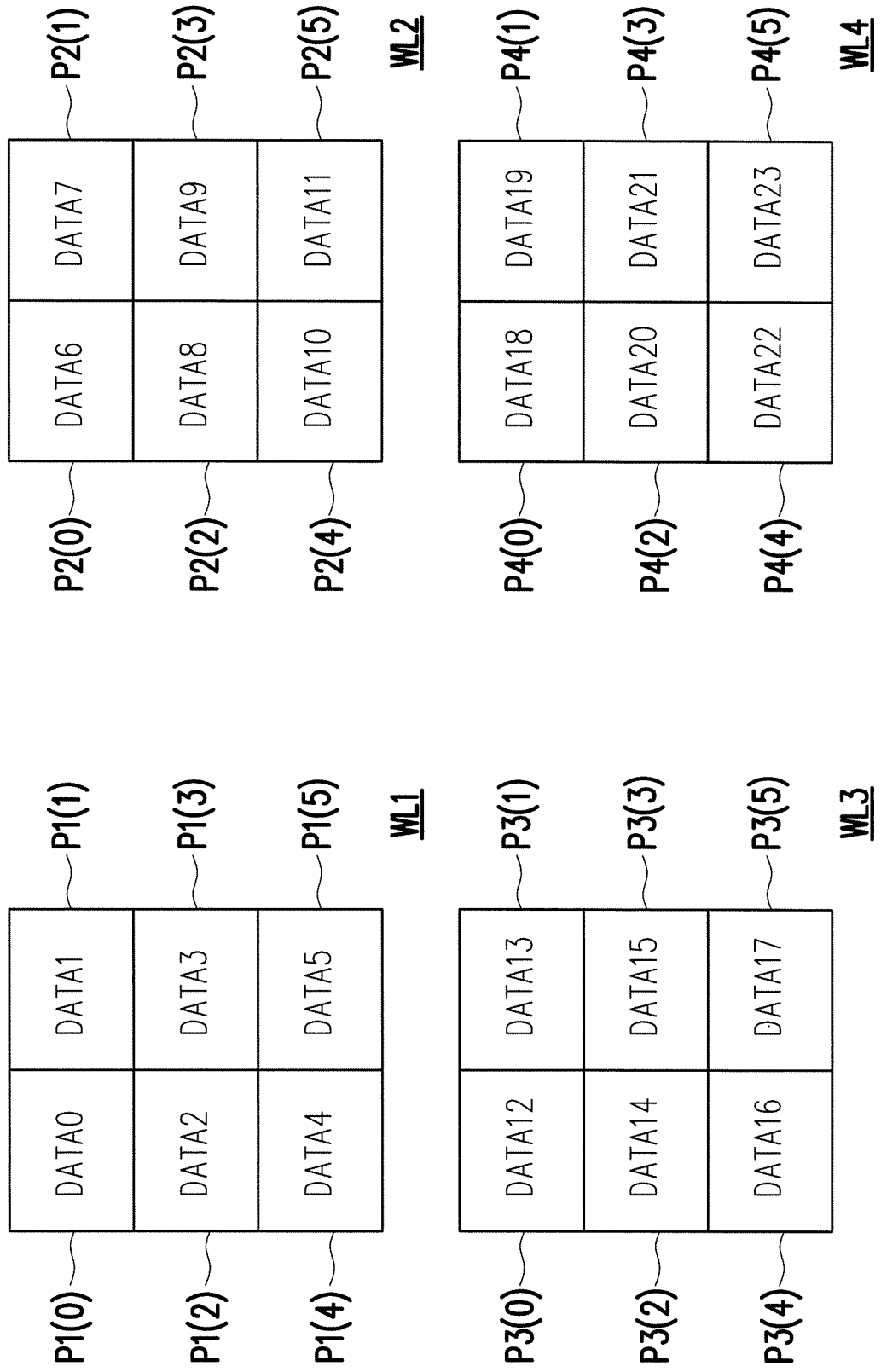
FIG. 9 illustrates a schematic diagram illustrating writing a plurality of data into physical pages on a plurality of word lines respectively according to another exemplary embodiment.

FIG. 9 illustrates a schematic diagram for writing a plurality of data into physical pages on a plurality of word lines respectively according to another exemplary embodiment.

With reference to FIG. 9, in the present exemplary embodiment, it is assumed that the RNVM module 406 is a Three-Dimensional (3D) NAND flash memory module, and six physical pages are formed by the memory cells on each word line in the RNVM module 406. As shown in FIG. 9, the RNVM module 406 may include, for example, a word line WL1, a word line WL2, a word line WL3 and a word line WL4. Physical pages P1(0) to P1(5) are formed by the memory cells on the word line WL1; physical pages P2(0) to P2(5) are formed by the memory cells on the word line WL2; physical pages P3(0) to P3(5) are formed by the memory cells on the word line WL3; physical pages P4(0) to P4(5) are formed by the memory cells on the word line WL4. Among them, the word line WL1, the word line WL2, the word line WL3 and the word line WL4 belong to different memory sub-modules, respectively. For example, the word line WL1 belongs to a first memory sub-module, the word line WL2 belongs to a second memory sub-module, the word line WL3 belongs to a third memory sub-module and the word line WL4 belongs to a fourth memory sub-module.

When the MMC 502 intends to perform the parallel writing for the physical pages on the word line WL1, the word line WL2, the word line WL3 and the word line WL4, the MMC 502 transmits at least one data request command to the host system 11, so as to request the host system 11 to transmit data to be stored in the physical pages P1(0) to P1(1) on the word line WL1, data to be stored in the physical pages P2(0) to P2(1) on the word line WL2, data to be stored in the physical pages P3(0) to P3(1) on the word line WL3 and data to be stored in the physical pages P4(0) to P4(1) on the word line WL4.

According to the data request command transmitted to the host system 11, the MMC 502 can obtain a sub-data DATA0 and a sub-data DATA1 to be written into the physical pages P1(0) to P1(1) on the word line WL1, a sub-data DATA6 and a sub-data DATA7 to be written into the physical pages P2(0) to P2(1) on the word line WL2, a sub-data DATA12 and a sub-data DATA13 to be written into the physical pages P3(0) to P3(1) on the word line WL3 and a sub-data DATA18 and a sub-data DATA19 to be written into the physical pages P4(0) to P4(1) on the word line WL4 from the host system 11.

Afterwards, the MMC 502 can sequentially write the sub-data DATA0, the sub-data DATA1, the sub-data DATA6, the sub-data DATA7, the sub-data DATA12, the sub-data DATA13, the sub-data DATA18 and the sub-data DATA19 into the physical page P1(0), the physical page P1(1), the physical page P2(0), the physical page P2(1), the physical page P3(0), the physical page P3(1), the physical page P4(0) and the physical page P4(1) respectively.

Thereafter, the MMC 502 further transmits at least one data request command to the host system 11, so as to request the host system 11 to transmit data to be stored in the physical pages P1(2) to P1(3) on the word line WL1, data to be stored in the physical pages P2(2) to P2(3) on the word line WL2, data to be stored in the physical pages P3(2) to P3(3) on the word line WL3 and data to be stored in the physical pages P4(2) to P4(3) on the word line WL4.

According to the data request command transmitted to the host system 11, the MMC 502 can obtain a sub-data DATA2 and a sub-data DATA3 to be written into the physical pages P1(2) to P1(3) on the word line WL1, a sub-data DATA8 and a sub-data DATA9 to be written into the physical pages P2(2) to P2(3) on the word line WL2, a sub-data DATA14 and a sub-data DATA15 to be written into the physical pages P3(2) to P3(3) on the word line WL3 and a sub-data DATA20 and a sub-data DATA21 to be written into the physical pages P4(2) to P4(3) on the word line WL4 from the host system 11.

Afterwards, the MMC 502 can sequentially write the sub-data DATA2, the sub-data DATA3, the sub-data DATA8, the sub-data DATA9, the sub-data DATA14, the sub-data DATA15, the sub-data DATA20 and the sub-data DATA21 into the physical page P1(2), the physical page P1(3), the physical page P2(2), the physical page P2(3), the physical page P3(2), the physical page P3(3), the physical page P4(2) and the physical page P4(3) respectively.

Thereafter, the MMC 502 can further transmit at least one data request command to the host system 11, so as to request the host system 11 to transmit data to be stored in the physical pages P1(4) to P1(5) on the word line WL1, data to be stored in the physical pages P2(4) to P2(5) on the word line WL2, data to be stored in the physical pages P3(4) to P3(5) on the word line WL3 and data to be stored in the physical pages P4(4) to P4(5) on the word line WL4.

According to the data request command transmitted to the host system 11, the MMC 502 can obtain a sub-data DATA4 and a sub-data DATA5 to be written into the physical pages P1(4) to P1(5) on the word line WL1, a sub-data DATA10 and a sub-data DATA11 to be written into the physical pages P2(4) to P4(5) on the word line WL2, a sub-data DATA16 and a sub-data DATA17 to be written into the physical pages P3(4) to P3(5) on the word line WL3 and a sub-data DATA22 and a sub-data DATA23 to be written into the physical pages P4(4) to P4(5) on the word line WL4 from the host system 11.

Afterwards, the MMC 502 can sequentially write the sub-data DATA4, the sub-data DATA5, the sub-data DATA10, the sub-data DATA11, the sub-data DATA16, the sub-data DATA17, the sub-data DATA22 and the sub-data DATA23 into the physical page P1(4), the physical page P1(5), the physical page P2(4), the physical page P2(5), the physical page P3(4), the physical page P3(5), the physical page P4(4) and the physical page P4(5) respectively.

In particular, a sequence order of aforementioned sub-data is in the following order: the sub-data DATA0, the sub-data DATA1, the sub-data DATA2, the sub-data DATA3, the sub-data DATA4, the sub-data DATA5, the sub-data DATA6, the sub-data DATA7, the sub-data DATA8, the sub-data DATA9, the sub-data DATA10, the sub-data DATA11, the sub-data DATA12, the sub-data DATA13, the sub-data DATA14, the sub-data DATA15, the sub-data DATA16, the sub-data DATA17, the sub-data DATA18, the sub-data DATA19, the sub-data DATA20, the sub-data DATA21, the sub-data DATA22 and the sub-data DATA23. In view of the foregoing content, it can be known that, the MMC 502 can obtain the discontinuous data from the host system 11 each time so as to perform the writing operation for each word line. Further, in view of the content of FIG. 9, after the writing operation described above is completed, the sub-data DATA6 and DATA7 stored in the physical pages P2(0) to P2(1) on the word line WL2 are arranged subsequent to the sub-data DATA4 and DATA5 stored in the physical pages P1(4) to P1(5) on the word line WL1. The sub-data DATA12 and DATA13 stored in the physical pages P3(0) to P3(1) on the word line WL3 are arranged subsequent to the sub-data DATA10 and DATA11 stored in the physical pages P2(4) to P2(5) on the word line WL2. The sub-data DATA18 and DATA19 stored in the physical pages P4(0) to P4(1) on the word line WL4 are arranged subsequent to the sub-data DATA16 and DATA17 stored in the physical pages P3(4) to P3(5) on the word line WL3.

Figure 10:
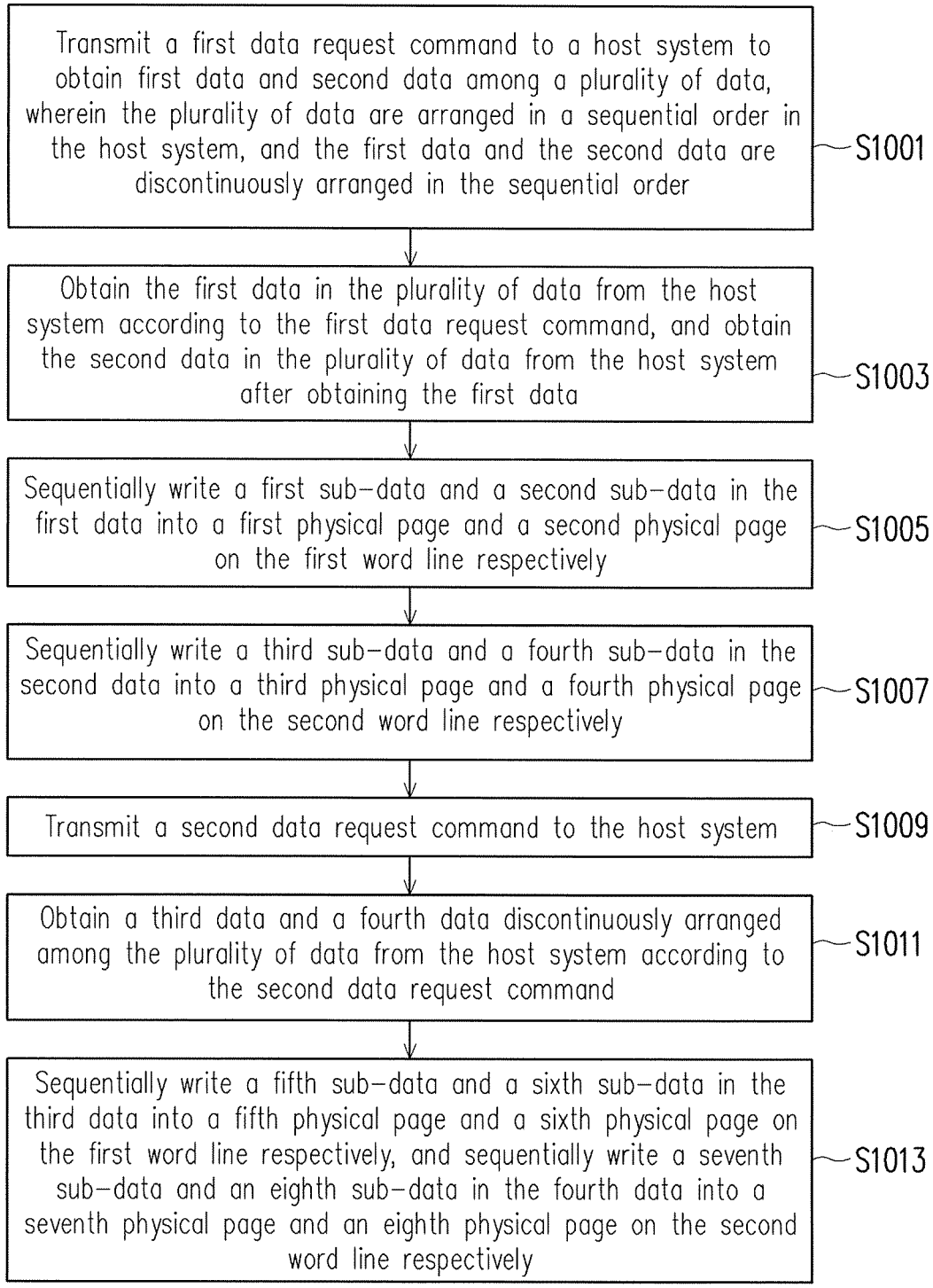
FIG. 10 is a flowchart of a data writing method according to another exemplary embodiment.

FIG. 10 is a flowchart of a data writing method according to another exemplary embodiment of the invention.

With reference to FIG. 10, in step S1001, the MMC 502 transmits a first data request command to a host system 11 to obtain first data and second data among a plurality of data, wherein the plurality of data are arranged in a sequential order in the host system, and the first data and the second data are discontinuously arranged in the sequential order. Here, the first data request command is configured to instruct the host system to transmit the first data to be stored in a corresponding physical page on a first word line and the second data to be stored in another corresponding page on a second word line. In step S1003, the MMC 502 obtains the first data in the plurality of data from the host system 11 according to the first data request command and obtains the second data in the plurality of data from the host system 11 after obtaining the first data. In step S1005, the MMC 502 sequentially writes a first sub-data and a second sub-data in the first data into a first physical page and a second physical page on the first word line respectively. In step S1007, the MMC 502 sequentially writes a third sub-data and a fourth sub-data in the second data into a third physical page and a fourth physical page on the second word line respectively. In step S1009, the MMC 502 transmits a second data request command to the host system 11. In step S1011, the MMC 502 obtains third data and fourth data among the plurality of data from the host system 11 according to the second data request command, wherein the third data and the fourth data are discontinuously arranged in the sequence order of the plurality of data, the first data and the third data are continuously arranged in the sequence order of the plurality of data, and the second data and the fourth data are continuously arranged in the sequence order of the plurality of data. In step S1013, the MMC 502 sequentially writes a fifth sub-data and a sixth sub-data in the third data into a fifth physical page and a sixth physical page on the first word line respectively, and sequentially writes a seventh sub-data and an eighth sub-data in the fourth data into a seventh physical page and an eighth physical page on the second word line respectively. In particular, the first word line belongs to the first memory sub-module, the second word line belongs to the second memory sub-module, and the first memory sub-module is different from the second memory sub-module.

It should be noted that, if the fifth physical page and the sixth physical page on the first word line are the last two physical pages on the first word line, the second data stored in the fifth physical page and the sixth physical page will be arranged subsequent to the third data stored in the starting two physical pages (i.e., the third physical page and the fourth physical page) on the second word line in the sequence order of the plurality of data.

In summary, with the data writing method, the MCC unit and the memory storage device according to the invention, commands can be given to obtain multiple discontinuous data from the host system to be respectively stored on different word lines. As a result, the memory storage device may be prevented from consuming too many resources due to a massive amount of continuous data being temporarily stored while achieving the technical effect of simultaneously writing the physical pages on multiple word lines. The previously described exemplary embodiments of the present invention have the advantages aforementioned, wherein the advantages aforementioned are not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method for a rewritable non-volatile memory module of a memory storage device, the rewritable non-volatile memory module comprising a plurality of memory sub-modules respectively coupled to a memory control circuit unit, the memory sub-modules comprising a plurality of word lines, a plurality of physical pages formed by a plurality of memory cells on the same word line among the plurality of word lines, the data writing method comprising:

transmitting, by a memory control circuit unit of the memory storage device, a first data request command to a host system to obtain first data and second data among a plurality of data, wherein the plurality of data is arranged in a sequential order in the host system, and the first data and the second data are discontinuously arranged in the sequential order;

obtaining, by the memory control circuit unit, the first data and the second data directly from the host system through a connection interface unit of the memory storage device according to the first data request command, such that usage of a buffer memory is reduced; and writing, by the memory control circuit unit, the first data into a first physical page and a second physical page on a first word line among the plurality of word lines via a first data bus and writing the second data into a third physical page and a fourth physical page on a second word line among the plurality of word lines via a second data bus, wherein the first word line belongs to a first memory sub-module among the plurality of memory sub-modules, and the second word line belongs to a second memory sub-module among the plurality of memory sub-modules.

2. The data writing method according to claim 1, wherein the first data comprises a first sub-data and a second sub-data, and the second data comprises a third sub-data and a fourth sub-data, wherein writing the first data into the first physical page and the second physical page on the first word line among the plurality of word lines comprises:

sequentially writing the first sub-data and the second sub-data into the first physical page and the second physical page on the first word line respectively, and wherein writing the second data into the third physical page and the fourth physical page on the second word line among the plurality of word lines comprises:

sequentially writing the third sub-data and the fourth sub-data into the third physical page and the fourth physical page on the second word line respectively.

3. The data writing method according to claim 2, wherein the data writing method further comprises, after sequentially writing the third sub-data and the fourth sub-data into the third physical page and the fourth physical page on the second word line respectively:

sequentially writing a fifth sub-data and a sixth sub-data in third data into a fifth physical page and a sixth physical page on the first word line respectively, and sequentially writing a seventh sub-data and an eighth sub-data in fourth data into a seventh physical page and an eighth physical page on the second word line respectively, wherein the third data and the fourth data are discontinuously arranged in the sequential order of the plurality of data.

4. The data writing method according to claim 3, wherein the first data and the third data are continuously arranged in the sequential order of the plurality of data, and the second data and the fourth data are continuously arranged in the sequential order of the plurality of data.

5. The data writing method according to claim 1, wherein the first data request command instructs the host system to transmit the first data to be stored in the first physical page and the second physical page on the first word line and the second data to be stored in the third physical page and the fourth physical page on the second word line.

6. A memory control circuit unit for controlling a rewritable non-volatile memory module of a memory storage device, the rewritable non-volatile memory module comprising a plurality of memory sub-modules, the plurality of memory sub-modules comprising a plurality of word lines, a plurality of physical pages form by a plurality of memory cells on the same word line among the plurality of word lines, the memory control circuit unit comprising:
 a host interface configured to couple to a host system;
 a memory interface configured to couple to the rewritable non-volatile memory module, wherein the plurality of memory sub-modules are respectively coupled to the memory interface; and
 a memory management circuit coupled to the host interface and the memory interface, wherein the memory management circuit is configured to:
  transmit a first data request command to the host system to obtain first data and second data among a plurality of data, wherein the plurality of data is arranged in a sequential order in the host system, and the first data and the second data are discontinuously arranged in the sequential order,
  obtain the first data and the second data directly from the host system through the host interface of the memory control circuit unit according to the first data request command, such that usage of a buffer memory is reduced, and
  write the first data into a first physical page and a second physical page on a first word line among the plurality of word lines via a first data bus and write the second data into a third physical page and a fourth physical page on a second word line among the plurality of word lines via a second data bus, wherein the first word line belongs to a first memory sub-module of the plurality of memory sub-modules, and the second word line belongs to a second memory sub-module among the plurality of memory sub-modules.

7. The memory control circuit unit according to claim 6, wherein the first data comprises a first sub-data and a second sub-data, and the second data comprises a third sub-data and a fourth sub-data,
 the memory management circuit is further configured to sequentially write the first sub-data and the second sub-data into the first physical page and the second physical page on the first word line respectively, when writing the first data into the first physical page and the second physical page on the first word line among the plurality of word lines, and
 the memory management circuit is further configured to sequentially write the third sub-data and the fourth sub-data into the third physical page and the fourth physical page on the second word line respectively when writing the second data into the third physical page and the fourth physical page on the second word line in the plurality of word lines.

8. The memory control circuit unit according to claim 7, wherein the memory management circuit is configured to, after the operation of sequentially writing the third sub-data and the fourth sub-data into the third physical page and the fourth physical page on the second word line respectively,
 sequentially write a fifth sub-data and a sixth sub-data in third data into a fifth physical page and a sixth physical page on the first word line respectively, and sequentially write a seventh sub-data and an eighth sub-data in fourth data into a seventh physical page and an eighth physical page on the second word line respectively,
 wherein the third data and the fourth data are discontinuously arranged in the sequential order of the plurality of data.

9. The memory control circuit unit according to claim 8, wherein the first data and the third data are continuously arranged in the sequential order of the plurality of data, and the second data and the fourth data are continuously arranged in the sequential order of the plurality of data.

10. The memory control circuit unit according to claim 6, wherein the first data request command instructs the host system to transmit the first data to be stored in the first physical page and the second physical page on the first word line and the second data to be stored in the third physical page and the fourth physical page on the second word line.

11. A memory storage device, comprising:
 a connection interface unit configured to couple to a host system;
 a rewritable non-volatile memory module, wherein the rewritable non-volatile memory module comprises a plurality of memory sub-modules, the plurality of memory sub-modules comprise a plurality of word lines, and a plurality of physical pages are formed by a plurality of memory cells on the same word line among the plurality of word lines; and
 a memory control circuit unit, coupled to the connection interface unit and the rewritable non-volatile memory module, the plurality of memory sub-modules respectively coupled to the memory control circuit unit,
 wherein the memory control circuit unit is configured to:
  transmit a first data request command to the host system to obtain first data and second data among a plurality of data, wherein the plurality of data is arranged in a sequential order in the host system, and the first data and the second data are discontinuously arranged in the sequential,
  obtain the first data and the second data directly from the host system through the connection interface unit of the memory storage device according to the first data request command, such that usage of a buffer memory is reduced, and
  write the first data into a first physical page and a second physical page on a first word line among the plurality of word lines via a first data bus and write the second data into a third physical page and a fourth physical page on a second word line among the plurality of word lines via a second data bus, wherein the first word line belongs to a first memory sub-module among the plurality of memory sub-modules, and the second word line belongs to a second memory sub-module among the plurality of memory sub-modules.

12. The memory storage device of claim 11, wherein the first data comprises a first sub-data and a second sub-data, and the second data comprises a third sub-data and a fourth sub-data, the memory control circuit unit is further configured to sequentially write the first sub-data and the second sub-data into the first physical page and the second physical page on the first word line respectively when writing the first data into the first physical page and the second physical page on the first word line in the plurality of word lines, the memory control circuit unit is further configured to sequentially write the third sub-data and the fourth sub-data into the third physical page and the fourth physical page on the second word line respectively when writing the second data into the third physical page and the fourth physical page on the second word line in the plurality of word lines.

13. The memory storage device of claim 12, wherein the memory control circuit unit is configured to, after the operation of sequentially writing the third sub-data and the fourth sub-data into the third physical page and the fourth physical page on the second word line respectively, sequentially write a fifth sub-data and a sixth sub-data in third data into a fifth physical page and a sixth physical page on the first word line respectively, and sequentially write a seventh sub-data and an eighth sub-data in fourth data into a seventh physical page and an eighth physical page on the second word line respectively, wherein the third data and the fourth data are discontinuously arranged in the sequential order of the plurality of data.

14. The memory storage device of claim 13, wherein the second data is arranged subsequent to the third data in the sequential order of the plurality of data.

15. The memory storage device of claim 11, wherein the first data request command instructs the host system to transmit the first data to be stored in the first physical page and the second physical page on the first word line and the second data to be stored in the third physical page and the fourth physical page on the second word line.

* * * * *